United States Patent [19]

Tiffen

[11] Patent Number: 5,040,011
[45] Date of Patent: Aug. 13, 1991

[54] SELF-MOUNTED CAMERA ACCESSORIES

[75] Inventor: Ira Tiffen, Mt. Sinai, N.Y.

[73] Assignee: Tiffen Manufacturing Corp., Hauppauge, N.Y.

[21] Appl. No.: 599,157

[22] Filed: Oct. 17, 1990

[51] Int. Cl.⁵ .................... G02B 7/00; G03B 11/00
[52] U.S. Cl. .................................. 354/295; 359/892
[58] Field of Search ............... 354/295, 286, 296, 288; 350/587, 318

[56] References Cited

U.S. PATENT DOCUMENTS 4,684,231  8/1987  Athy .................................. 354/295

Primary Examiner—Michael L. Gellner
Attorney, Agent, or Firm—Kirschstein, Ottinger, Israel & Schiffmiller

[57] ABSTRACT

Accessories are self-mounted on and removable from a camera by the use of locking portions which are resiliently and cantileverly mounted on each accessory.

19 Claims, 3 Drawing Sheets

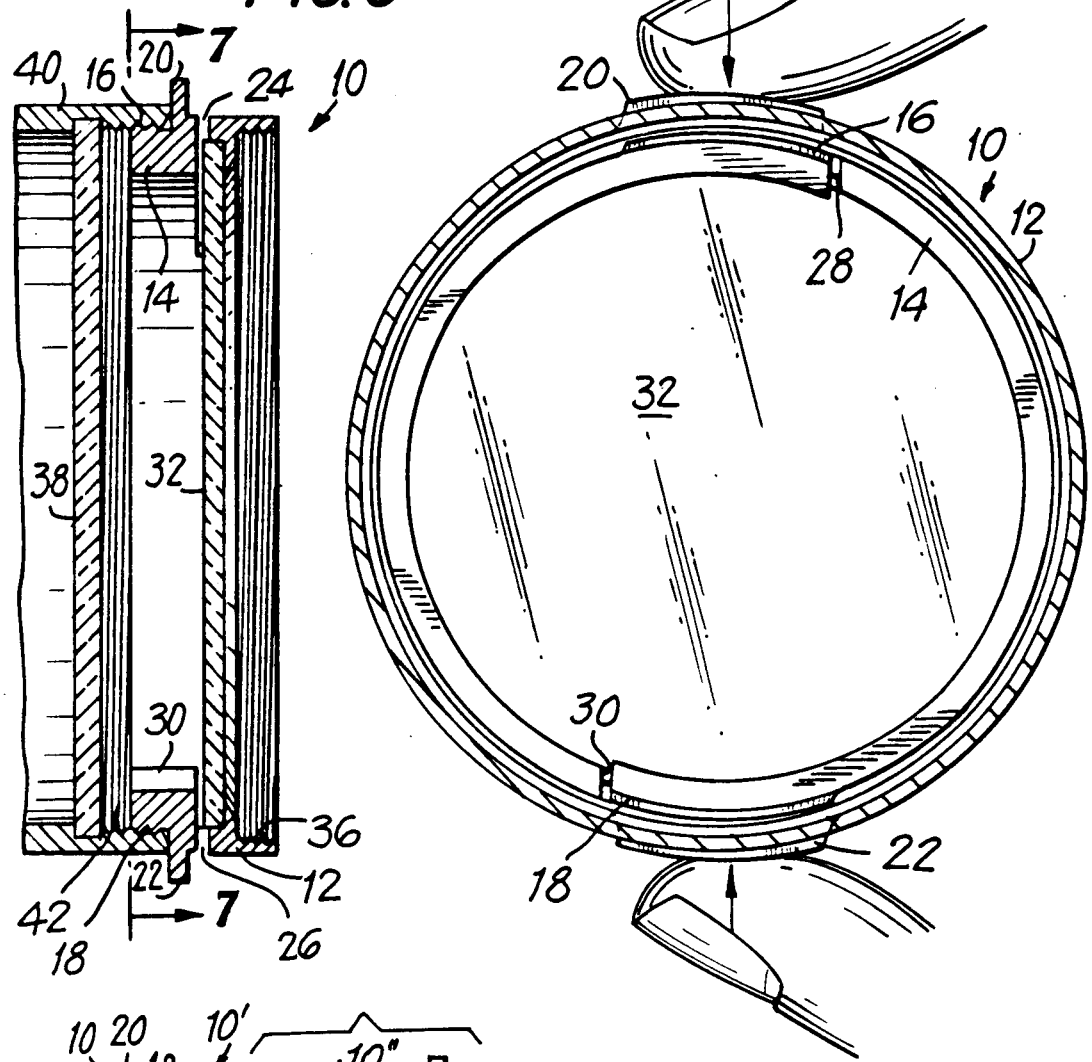
FIG. 6
FIG. 7
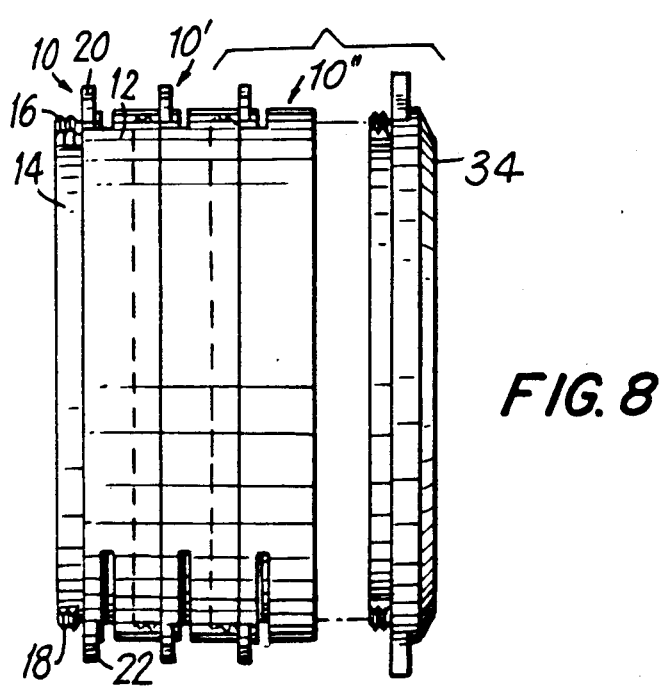
FIG. 8

SELF-MOUNTED CAMERA ACCESSORIES

BACKGROUND OF THE INVENTION

1. Field of the Invention

This invention relates to camera accessories, each self-mounted in front of a camera lens with a snaptype action and readily removable therefrom.

2. Description of Related Art

It is well known to mount filter holders in front of a camera lens. A conventional filter holder for a 35 mm camera has a rear annular externally-threaded portion and a front annular interiorly-threaded portion. The camera lens is mounted in a housing that is internally threaded forwardly of the lens. The externally-threaded rear portion of the filter holder threadedly engages the internally-threaded section of the housing. The front internally-threaded portion of the filter holder threadedly engages the externally-threaded rear portion of another conventional filter holder, thereby allowing a plurality of filter holders to be threaded into one another in axially adjacent relationship to form a stack of filter holders.

The use of threaded filter holders has not proven to be altogether desirable in practice, because of the tendency to cross the threads between adjacent filter holders, and between a filter holder and the lens housing. Rapid replacement of one or more filter holders is difficult because of the time required to unthread stacked filters from one another and from the lens housing.

To help alleviate such drawbacks, the art has proposed, for example, in U.S. Pat. No. 4,684,231, to use multi-part assemblies requiring the use of special threaded adaptors and special non-threaded filter holders. A first filter holder is snap-mounted on the adaptor. Additional filter holders are snap-mounted in front of the aforementioned filter holder. However, such snap-mounted assemblies have not proven to be altogether satisfactory. The adaptor must still be threaded to the lens housing, thereby raising the possibility of cross-threading. As a separate piece, the adaptor must be individually stored, transported, mounted and dismounted, any one of which procedures tending to lead to misplacement or loss of the adaptor. Also, the lack of any threads on the filter holders prevents their being turned into close intimate contact with an adjacent camera accessory.

Snap-mounted camera accessories other than filter holders are also known. For example, multi-part lens cap assemblies are used as the outermost accessory to protect the camera lens and/or any accessories between the camera lens and the lens cap assembly from damage. The lens cap assembly includes diametrically opposed spring-biased locking tabs mounted on a cap member. The tabs engage with snap-type action an interiorly-threaded section, either on the lens housing or on a filter holder or like accessory. The tabs are mounted on the cap member for radial movement toward and away from each other, and are totally unsuitable for use on filter holders since the spring-biased tabs overlie a central region of the cap member and would block light passing through the central region of the filter.

SUMMARY OF THE INVENTION

1. Objects of the Invention

It is a general object of this invention to provide a camera attachment system which would permit a camera accessory itself to be rapidly attached to and dismounted from a lens housing of a camera.

It is another object of this invention to permit a group of interconnected camera accessories to be quickly separated from one another and from the lens housing.

Another object of this invention is to eliminate the use of, and the need for, special adaptors which are prone to misplacement or loss.

A further object of this invention is to provide a self-mounting camera accessory of inexpensive, one-piece construction.

An additional object of this invention is to provide a self-mounting cover for rapid attachment to and removal from a threaded member, not necessarily a camera housing.

2. Features of the Invention

In keeping with these objects, and others which will become apparent hereinafter, one feature of this invention resides, briefly stated, in a camera attachment system for use with a camera which includes a lens mounted in a housing having a hollow cylindrical extension extending forwardly of the lens along a longitudinal axis. The extension has an internally-threaded section of a predetermined diameter. The camera may be a 35 mm camera, a video camera, or, in short, any device having a lens through which light passes.

The system comprises one or more accessories, each self-mounted on, and removable from, the camera in mounted and removed positions, respectively. Each accessory includes a member which preferably, but not necessarily, has an annular seating portion whose outer diameter is smaller than said predetermined diameter. The seating portion is seated within the extension in the mounted position.

The member further has at least one movable locking portion, and preferably a pair of diametrically-opposite movable locking portions integral with, and extending radially outwardly of, the seating portion. Integral spring means are provided for resiliently and cantileverly mounting said at least one locking portion, and preferably both the locking portions on the member for generally radial movement toward each other to the removed position in which the locking portions are disengaged from the internally-threaded section, and away from each other to the mounted position in which the locking portions engage the internally-threaded section within the extension.

The member still further includes at least one movable handle portion, and preferably a pair of diametrically-opposite movable handle portions integral with, and extending radially outwardly of, the locking portions for manually moving the locking portions to the removed position. The integral spring means is operative for automatically returning the locking portions to the mounted position.

Advantageously, the seating portion, the locking portions and the handle portions are constituted of synthetic plastic material of one piece with the member. Preferably, the member is annular, and it, as well as the annular seating portion, is centered on and symmetrical with the longitudinal axis.

Each locking portion is threaded, and threadedly engages the internally-threaded section in the mounted position. Advantageously, each threaded locking portion extends partially circumferentially of the longitudinal axis and is of limited angular extent. This tends to alleviate the prior art problem of cross-threading between a camera accessory and the less housing.

The integral spring means includes a pair of first slots and a pair of second slots in the member. Each first slot extends partialy circumferentially of the longitudinal axis. Each second slot extends from a respective first slot along the longitudinal axis through the seating portion. Each locking portion is preferably adjacent a respective second slot.

The accessories may be filtered holders, lens shades, lens caps, converter rings, polarizers, additional lenses and, in short, any device which a photographer may wish to mount in front of the camera lens. A filter holder positions a filter or light-transmissive element in front of the lens. A cap positions an opaque wall in front of the lens. A converter ring holds nothing in front of the lens and is used to enable other accessories to be mounted in front of the lens.

Multiple accessories can be snap-mounted in an axially-adjacent relationship in front of the camera lens. Each accessory can be quickly and easily removed from the other accessories. No special adaptors are necessary.

The integral spring means has applications broader than being limiter to mounting camera accessories. Thus, a cover having at least one locking portion and at least one handle portion can be attached to, and removed from, any threaded member, for example, a neck of a container.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 6 is a partly broken-away sectional view of the filter holder of FIG. 1 mounted on a camera lens housing;

FIG. 7 is a sectional view taken on line 7—7 of FIG. 6 depicting the removal of the filter holder from the camera housing; and FIG. 8 is a stack of filter holders and a lens cap for attachment to a camera.

DETAILED DESCRIPTION OF THE PREFERRED EMBODIMENTS

Figure 1:
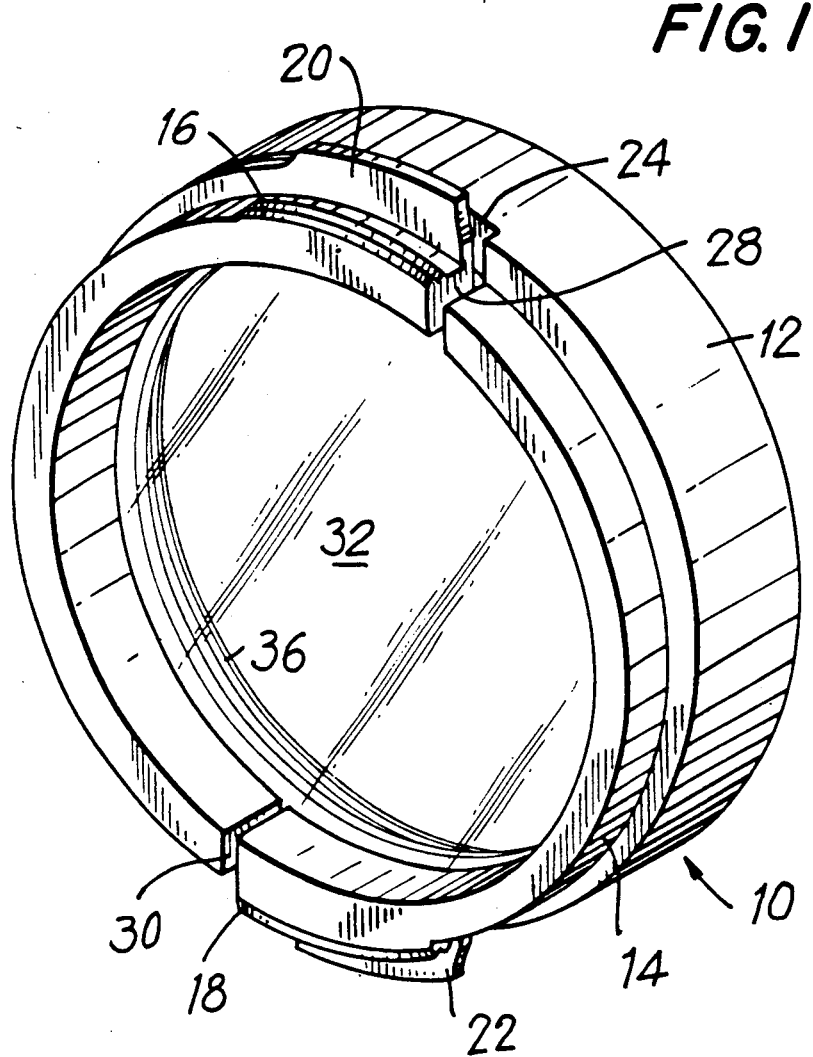
FIG. 1 is an enlarged perspective view of a filter holder accessory in accordance with this invention.
Figure 5:
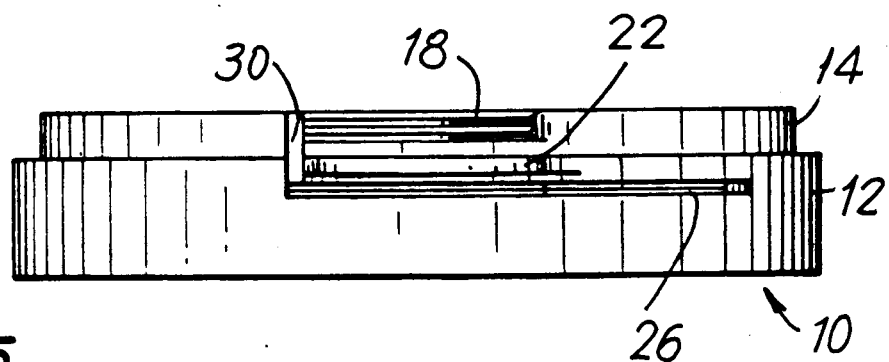
FIG. 5 is a bottom view of FIG. 1.
Figure 4:
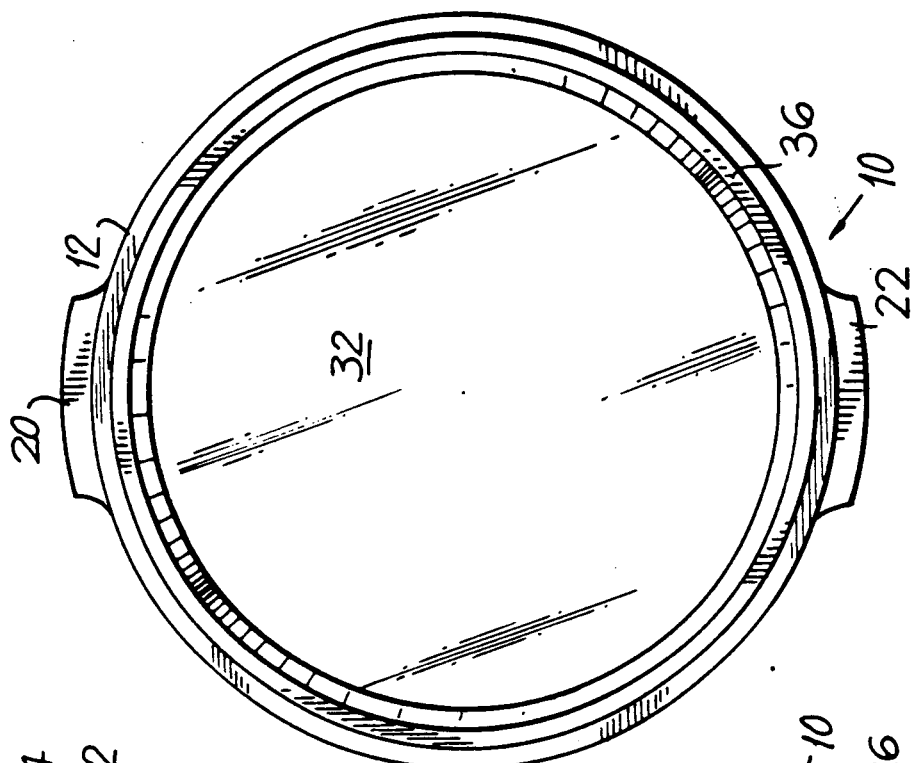
FIG. 4 is a rear view of FIG. 1.
Figure 3:
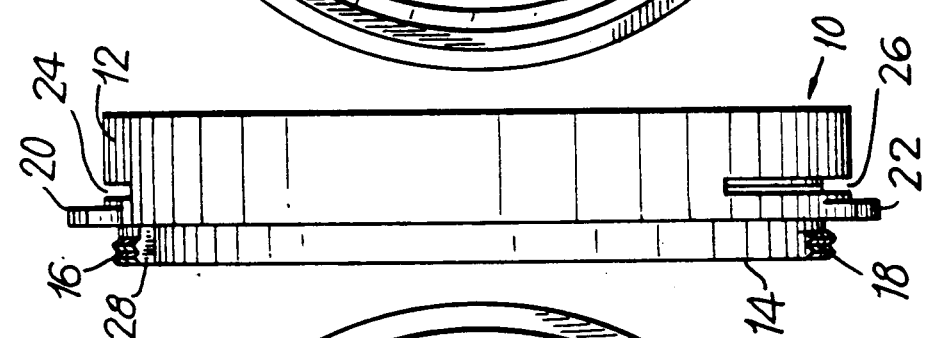
FIG. 3 is a side view of FIG. 1.
Figure 2:
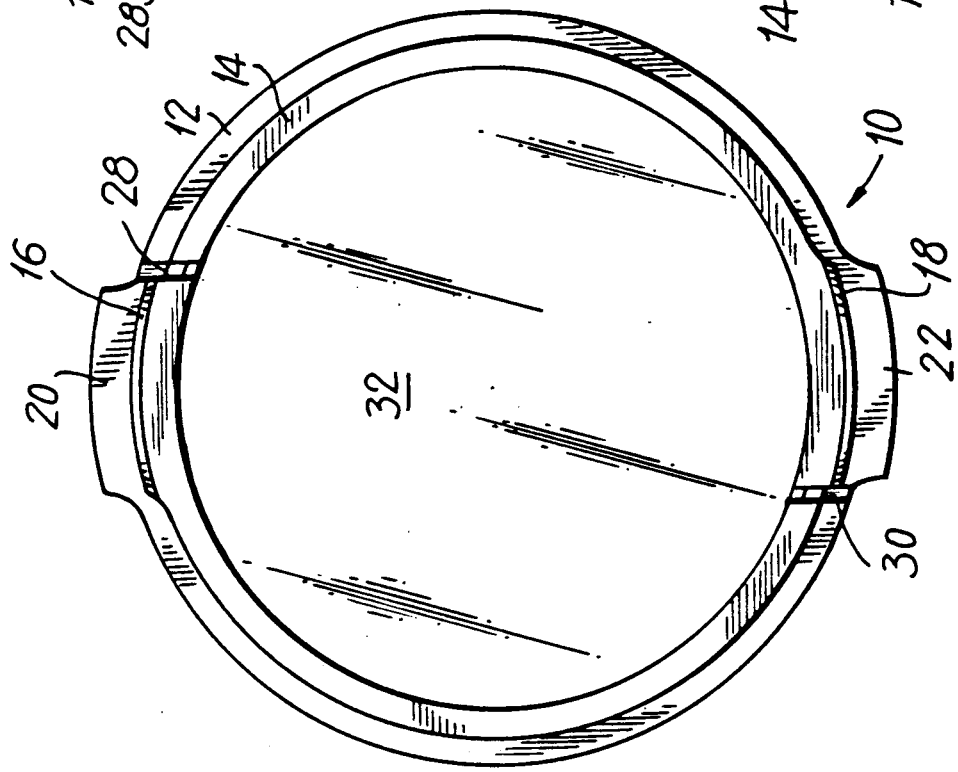
FIG. 2 is a front view of FIG. 1.

Referring now to FIGS. 1-5, a camera accessory 10, in this case a filter holder, includes an annular member or ring 12 and an annular seating portion 14, each centered on, and symmetrical about, a central axis. The seating portion 14 is of one piece with, and has a smaller outer diameter than, the ring 12. A pair of diametrically-opposite movable locking portions 16, 18 are integral with, and extend radially outwardly of, the seating portion 14. Each locking portion 16, 18 has an arc-shaped threaded portion advantageously consisting of one or two threads extending partially circumferentially of the axis. A pair of diametrically-opposite movable handle portions 20, 22 are integral with, and extend radially outwardly of, the locking portions for manually urging the latter toward each other.

In accordance with this invention, integral spring means are provided for mounting the locking portions for generally radial movement in a resilient and cantilever manner. The spring means includes a pair of first slots 24, 26, and a pair of second slots 28, 30 formed in the ring 12. Each first slot 24, 26 extends partially circumferentially of the axis in the ring, and extends circumferentially past a respective locking portion. Each second slot 28, 30-extends along the axis from a respective first slot to and through the seating portion 14 adjacent the respective locking portion. The slots 24,28 provide a cantilever mounting for the locking portion 16. The slots 26,30 provide a cantilever mounting for the locking portion 18. By molding the ring and portions 14, 16, 18, 20, 22 of a one-piece, resilient, synthetic plastic material, the locking portions 16,18 are resiliently mounted on the ring and selfbias themselves to the unstressed position shown in FIGS. 1-5.

A light-transmissive element 32, such as a light-modifying filter, is mounted within the ring 12 when the accessory is intended to be used as a filter holder. When the accessory is used as a protective lens cap, such as is indicated by accessory 34 in FIG. 8, no filter is used. Instead, the central region of the ring 12 is an opaque wall of one piece with the ring 12. When the accessory is used as a converter ring, no wall whatsoever is present within the ring 12.

An interiorly-threaded front section 36 is provided within the ring 12. The threaded section 36 allows additional accessories 10', 10" (see FIG. 8), similar to the first-mentioned accessory 10, to be mounted adjacent the latter in a stack.

Turning now to FIG. 6, a main focusing lens 38 of a camera is mounted in a lens housing having a hollow, cylindrical extension 40 extending forwardly of the lens 38. The extension has an internally-threaded section 42 of a predetermined diameter. The outer diameter of the annular seating portion 14 and of the locking portions 16,18 are less than said predetermined diameter to enable the seating portion 14 to be seated within the extension 40, and also enables the locking portions 16,18 to threadedly engage the threaded section 42 within the extension 40 in a mounted position as illustrated in FIG. 6.

In order to mount the accessory, it is urged along the longitudinal axis onto the internally-threaded section 42. The cantilever mounting of the locking portions 16,18 permits the latter to move in either axial direction, thereby enabling the locking portions to align with the internally-threaded section without regard to angular orientation of the accessory. The locking portions 16,18 contact and snappingly engage facing portions of the internally-threaded section 42.

To facilitate the mounting of the accessory, a user manually depresses or squeezes the handle portions 20,22 together, preferably between thumb and forefinger (see FIG. 7), thereby also urging the locking portions 16,18 generally radially toward each other. Once the accessory is seated, that is, once the seating portion is positively within the extension, the handle portions 20,22 are released, thereby allowing the locking portions to resiliently bias themselves back to their original positions.

In order to remove the accessory 10 from the mounted position, the user manually depresses or squeezes the handle portions 20,22 together again, thereby also urging the locking portions 16,18 generally radially toward each other to a removed position in which the locking portions are disengaged from the threaded section 42. The accessory is axially pulled away from the extension. The accessory 10 is snapped off the extension 40 without requiring any time-consuming unthreading procedure or risking cross-threading. When the squeezing pressure is released, the resilient mounting for the locking portions automatically returns the latter to their initial unstressed positions.

The integral spring means allows space for the filter, particularly in its central region, without adding to the outer diameter of the accessory. The accessory can be mounted or snapped in place without first depressing the handle portions, i.e. merely by exerting an axially-directed force of sufficient strength to overcome the resilient mounting of the locking portions However, the accessory will seat more firmly and more often if the handle portions are first depressed.

Once snapped in place, the accessory can be turned to allow the threaded locking portions to thread more fully into the threaded section 42. This permits a closer, more intimate contact between the accessory 10 and the threaded section 42, as well as between adjacent accessories.

In the stack of accessories shown in FIG. 8, any individual one can be removed simply and quickly by merely depressing the handle portions for that specific accessory. Only one hand need be used by a photographer to effect such removal. This is a big convenience for the photographer who is already holding a camera in one hand.

In a modification of the invention, the locking portions 16,18 need not be diametrically opposite each other, nor need they both be movable It is sufficient to have a single movable locking portion. More than two locking portions are also contemplated, particularly for those broader applications where childresistant closures are contemplated. Thus, in the case where a closure for a container is provided with the aforementioned integral spring means, multiple locking and handle portions serve to resist a rapid and easy opening of the container, thereby resisting child access.

It will be understood that each of the elements described above, or two or more together, also may find a useful application in other types of constructions differing from the types described above.

While the invention has been illustrated and described as embodied in self-mounting camera accessories, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a camera including a lens mounted in a housing having a hollow, cylindrical extension extending forwardly of the lens along a longitudinal axis and having an internally-threaded section of a predetermined diameter, a camera attachment system, comprising:
   an accessory self-mounted on, and removable from, the camera in mounted and removed positions, respectively, said accessory including an accessory member including
   (a) at least one movable locking portion on the member;
   (b) integral spring means for resiliently and cantileverly mounting said at least one locking portion for generally radial movement relative to the longitudinal axis between a removed position in which said at least one locking portion is disengaged from the internally-threaded section, and a mounted position in which said at least one locking portion engages the internally-threaded section within the extension; and
   (c) at least one movable handle portion operatively connected with said at least one locking portion for manually moving said at least one locking portion to the removed position, said integral spring means being operative for automatically returning said at least one locking portion to the mounted position.

2. The system as recited in claim 1, wherein the accessory member further includes an annular seating portion having an outer diameter smaller than said predetermined diameter and seated within the extension in the mounted position.

3. The system as recited in claim 2, wherein two movable locking portions are integral with, and extend radially outwardly of, the seating portion, said locking portions being diametrically opposite each other.

4. The system as recited in claim 3, wherein two movable handle portions are integral with, and extend radially outwardly of, the locking portions, said handle portions being diametrically opposite each other.

5. The system as recited in claim 3, wherein the handle portions move the locking portions toward each other to the removed position.

6. The system as recited in claim 4, wherein the seating portion, the locking portions and the handle portions are constituted of synthetic plastic material of one piece with the member.

7. The system as recited in claim 2, wherein the member is annular, and wherein the annular member and the annular seating portion are each centered on, and symmetrical with, the longitudinal axis.

8. The system as recited in claim 3, wherein each locking portion is threaded, and threadedly engages the internally-threaded section in the mounted position.

9. The system as recited in claim 2, wherein the spring means includes a pair of first slots in the member, each extending partially circumferentially of the longitudinal axis; and a pair of second slots in the member, each extending from a respective first slot along the longitudinal axis through the seating portion.

10. The system as recited in claim 1, wherein the member is an annular holder bounding an interior; and further comprising a light-transmissive element stationarily mounted within the interior of the annular holder.

11. The system as recited in claim 10, wherein the light-transmissive element is an optical filter.

12. The system as recited in claim 1, wherein the member has an annular ring portion that has an internally threaded part; and further comprising at least one further accessory mountable on, and removable from, the internally-threaded part of the annular ring portion of said first-mentioned accessory.

13. In a camera including a lens mounted in a housing having a hollow, cylindrical extension extending forwardly of the lens along a longitudinal axis and having an internally-threaded section of a predetermined diameter, a camera attachment system, comprising:

an accessory self-mounted oh, and removable from, the camera in mounted and removed positions, respectively, said accessory including an accessory member including (a) an annular seating portion having an outer diameter smaller than said predetermined diameter and seated within the extension in the mounted position;

(b) a pair of diametrically opposite, movable locking portions integral with, and extending radially outwardly of, the seating portion;

(c) integral spring means for resiliently and cantileverly mounting the locking portions on the member for generally radial movement toward each other to the removed position in which the locking portions are disengaged from the internally-threaded section, and away from each other to the mounted position in which the locking portions engage the internally-threaded section within the extension; and (d) a pair of diametrically opposite, movable handle portions integral with, and extending radially outwardly of, the locking portions for manually moving the locking portions to the removed position, said integral spring means being operative for automatically returning the locking portions to the mounted position.

14. In a container having an extension extending along a longitudinal axis and an internally-threaded section, a closure self-mounted on, and removable from, the container in mounted and removed positions, respectively, said closure comprising:

(a) at least one movable locking portion on the closure;

(b) integral spring means for resiliently and cantileverly mounting said at least one locking portion for generally radial movement relative to the longitudinal axis between a removed position in which said at least one locking portion is disengaged from the internally-threaded section, and a mounted position in which said at least one locking portion engages the internally-threaded section within the extension; and (c) at least one movable handle portion operatively connected with said at least one locking portion for manually moving said at least one locking portion to the removed position, said integral spring means being operative for automatically returning said at least one locking portion to the mounted position.

15. The closure as recited in claim 14, wherein the closure further includes an annular seating portion seated within the extension in the mounted position.

16. The closure as recited in claim 15, wherein two movable locking portions are integral with, and extend radially outwardly of, the seating portion, said locking portions being diametrically opposite each other.

17. The closure as recited in claim 16, wherein two movable handle portions are integral with, and extend radially outwardly of, the locking portions, said handle portions being diametrically opposite each other.

18. The closure as recited in claim 16, wherein the handle portions move the locking portions toward each other to the removed position.

19. The closure as recited in claim 16, wherein each locking portion is threaded, and threadedly engages the internally-threaded section in the mounted position.

* * * * *